United States Patent
Hamilton, II et al.

(10) Patent No.: US 6,557,050 B1
(45) Date of Patent: Apr. 29, 2003

(54) DISPLAY COMPUTER WITH ON-SCREEN IDENTIFIERS FOR MULTIPLE SERIAL PORTS FOR AVOIDING PHYSICAL MISLABELLING OF PORTS

(75) Inventors: Rick Allen Hamilton, II, Austin, TX (US); Chetan Mehta, Austin, TX (US); Jayeshkumar M. Patel, Austin, TX (US); Maulin Ishwarbhai Patel, Round Rock, TX (US)

(73) Assignee: International Business Machines Corporation, Armonk, NJ (US)

(*) Notice: Subject to any disclaimer, the term of this patent is extended or adjusted under 35 U.S.C. 154(b) by 0 days.

(21) Appl. No.: 09/389,196

(22) Filed: Sep. 2, 1999

(51) Int. Cl.$^7$ .................... G06F 13/00; G06F 13/10
(52) U.S. Cl. ................ 710/19; 710/2; 710/15; 710/18; 710/300; 345/156; 345/705
(58) Field of Search ................ 710/19, 18, 15, 710/2, 300; 345/156, 744, 705

(56) References Cited

U.S. PATENT DOCUMENTS

| | | | | |
|---|---|---|---|---|
| 5,353,399 A | | 10/1994 | Kuwamoto et al. | 395/159 |
| 5,542,069 A | | 7/1996 | Meppelink et al. | 395/500 |
| 5,555,374 A | * | 9/1996 | Armerding et al. | 710/15 |
| 5,621,438 A | | 4/1997 | Kamimura et al. | 345/178 |
| 5,621,879 A | | 4/1997 | Kohda | 395/340 |
| 5,760,842 A | | 6/1998 | Song | 348/564 |
| 5,831,597 A | * | 11/1998 | West et al. | 345/156 |
| 5,841,972 A | * | 11/1998 | Fanshier | 709/220 |
| 5,909,543 A | * | 6/1999 | Tanaka et al. | 348/14.08 |
| 5,923,729 A | * | 7/1999 | Dezonno | 379/15.01 |
| 5,973,690 A | * | 10/1999 | Ofer et al. | 345/705 |
| 6,105,065 A | * | 8/2000 | Rao et al. | 709/205 |
| 6,333,739 B1 | * | 12/2001 | Koyama et al. | 345/744 |

* cited by examiner

Primary Examiner—Jeffrey Gaffin
Assistant Examiner—Rehana Perveen
(74) Attorney, Agent, or Firm—Jerry B. Kraft; Mark E. McBurney

(57) ABSTRACT

In a display computer with multiple serial ports, there is provided an on-screen facility for identifying each of the serial ports with a numerical identifier. A process is provided responsive to a change in the status of a connection to any serial port that displays the identifier for that serial port. The change in status takes place when connecting to the serial port. The process may be effectively used in systems having their serial ports extended through a universal serial bus. The identifiers for the serial ports may be stored in a look-up table from which the appropriate identifier may be obtained and displayed upon the connection of a peripheral device to a serial port. Among the many advantages of this on-screen serial port identification is the assurance that the user will not be confused or obstructed by any errors in the physical labelling of serial ports in the manufacture or assembly of computer hardware. Such mislabelling is often the result of unintentional cross-overs in the wiring of the multiple serial ports.

21 Claims, 5 Drawing Sheets

DISPLAY COMPUTER WITH ON-SCREEN IDENTIFIERS FOR MULTIPLE SERIAL PORTS FOR AVOIDING PHYSICAL MISLABELLING OF PORTS

TECHNICAL FIELD

The present invention relates to user interactive computers controlled through display interfaces, and particularly to the connection of peripheral devices to the computer through multiple serial ports.

BACKGROUND OF RELATED ART

The 1990's decade has been marked by a technological revolution driven by the convergence of the data processing industry with the consumer electronics industry. This advance has been even further accelerated by the extensive consumer and business involvement in the Internet over the past few years. As a result of these changes, it seems as if virtually all aspects of human endeavor in the industrialized world require the use of computer terminals. There is a need to make computer directed activities accessible to a substantial portion of the world's population which, up to a few years ago, was computer indifferent. The computer industries are making substantial efforts and progress in making the computer more accessible and easier to set up, operate and modify by this new population of computer users.

On the other hand, with the increasing power of computers, functions and resources available to the interactive user have greatly increased. Energized by the convergence of computers with electronic media industries, increasing computer resource has been devoted to the computer-electronic media interfaces and controls. A wide variety of peripheral electronic media devices are now connectable to computers. In addition, with the increased availability of relatively inexpensive integrated circuit technologies, increasing numbers of functions which were originally performed by the computer system itself are performed by peripheral devices connected to the computer. Most of these peripheral devices are attached to the computer through serial ports.

External modems have been conventionally attached to computers via serial ports. In addition, mice, joysticks, drawing tablets, MIDI sound modules for recording and playing back music, handheld computers or even notebook computers, monitors, and scanners are just a few examples of peripheral devices which may be connected to the computer through serial ports.

As a result, in recent years, the number of serial ports for access of peripheral devices to the computer have increased from a couple to well over a hundred of such serial ports as implemented through the Universal Serial Bus (USB) and similar serial port expansion units. This in turn has resulted in significant problems in keeping track of the physical labelling, i.e. the connector cable attachments. The conventional physical labelling of the cables and ports has become quite cumbersome, confusing and particularly discomforting to the novice computer user. Mislabelling of cables and ports can also present problems. It is not uncommon during the manufacture and assembly of computer hardware for wiring to become cross-connected so that the actual serial port connection may not match the labelling of the port.

SUMMARY OF THE PRESENT INVENTION

The present invention involves an easy to use and effective solution to the problem by providing on-screen identifiers for the serial ports as peripheral devices are connected to such ports. Accordingly, in a computer with an interactive display, a serial I/O bus, and a plurality of serial ports for connecting peripheral devices to said computer through said serial bus, there is provided means for storing identifiers for each of said plurality of serial ports, and means for displaying the identifier for a serial port responsive to any change in the status of a connection to a peripheral device at said port. Thus, the change in status may result from connecting a new peripheral device to the serial port or it may result from disconnecting a peripheral device from the serial port. The displayed identifier may conveniently be numerical. Also, the invention may be effectively used when there is a USB extension to which identifiable serial ports are connected. This universal bus extension may comprise a plurality of linkable bus extension modules, each of said bus extension modules comprising at least one of said plurality of serial ports.

Effective results may be achieved when the identifiers are stored in a look-up table, and the means for displaying an identifier comprises means for detecting the connection of a new peripheral device to any of said serial ports, and means responsive to the detection for looking up the identifier for the connected port and imparting said identifier to said display means.

BRIEF DESCRIPTION OF THE DRAWINGS

The present invention will be better understood and its numerous objects and advantages will become more apparent to those skilled in the art by reference to the following drawings, in conjunction with the accompanying specification, in which.

DETAILED DESCRIPTION OF THE PREFERRED EMBODIMENT

Figure 1:
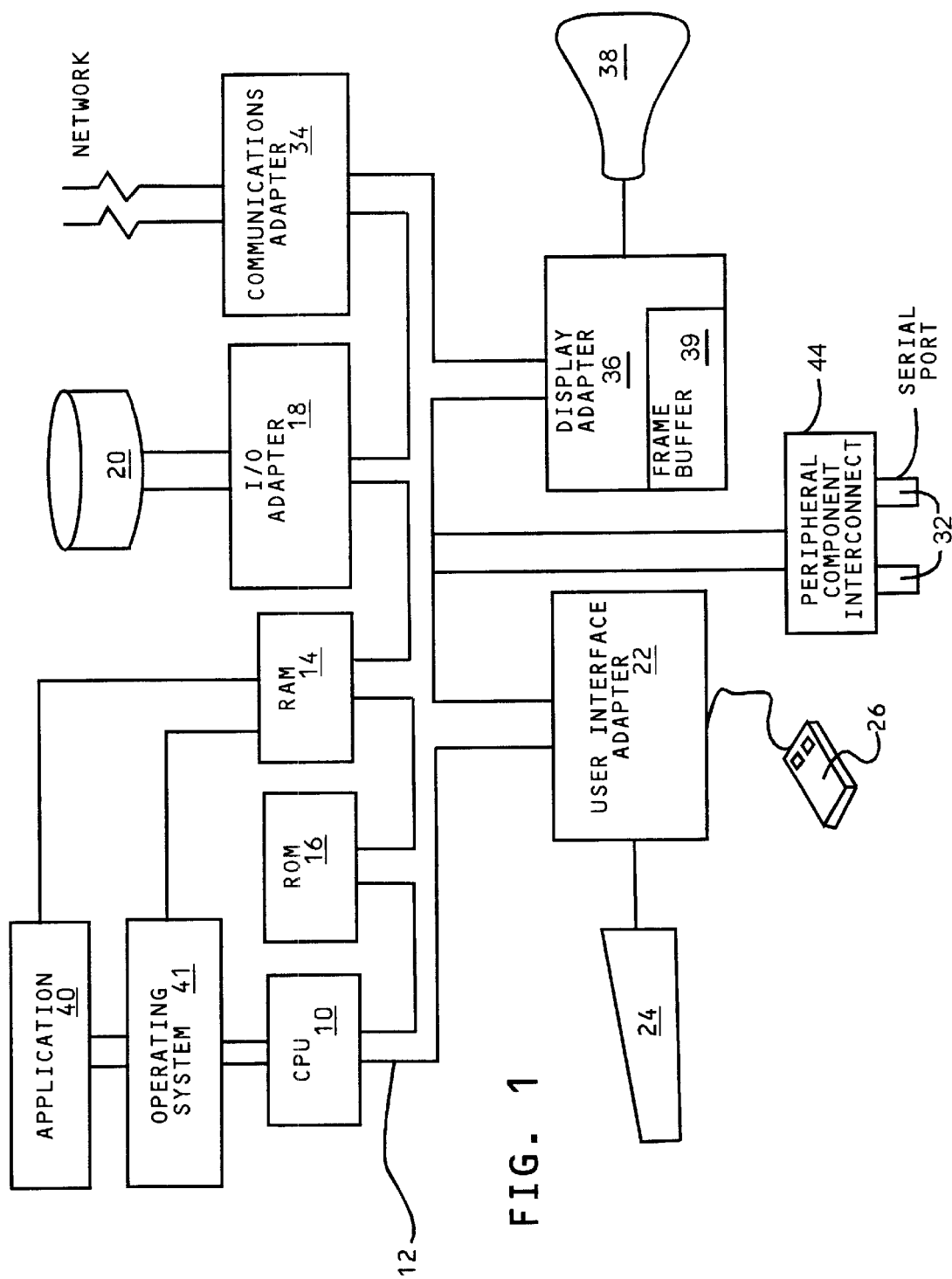
FIG. 1 is a block diagram of an interactive data processor controlled display system including a central processing unit which is capable of implementing serial port identification of the present invention.

Referring to FIG. 1, a typical data processing system is shown which may function as the computer controlled display terminal used to display the serial port identifiers in accordance with the present invention and for providing the system for determining to which serial port a peripheral device has been connected. In this example it is also the computer to which the functioning peripheral devices are added. A central processing unit (CPU) 10, such as one of the PC microprocessors distributed by International Business Machine Corporation (IBM), or workstations, e.g. RISC System/6000(™) (RS/6000) (RISC System/6000 is a trademark of IBM) series available from IBM, is provided and interconnected to various other components by system bus 12. An operating system 41 runs on CPU 10, provides control and is used to coordinate the function of the various components of FIG. 1. Operating system 41 may be one of the commercially available windows type of operating systems such as the AIX(™) operating system; Microsoft's Windows 98(™) or Windows NT(™), as well as UNIX and AIX operating systems in general. Application programs 40, controlled by the system, are moved into and out of the main memory, Random Access Memory (RAM) 14. These programs include the program of the present invention to be subsequently described for determining and displaying the identifier for the port to which a peripheral device has been connected. A read only memory (ROM) 16 is connected to CPU 10 via bus 12 and includes the basic input/output system (BIOS) that controls the basic computer functions. RAM 14, I/O adapter 18 and communications adapter 34 are also interconnected directly to system bus 12. It should be noted that software components, including the operating system 41 and the application 40, are loaded into RAM 14, which is the computer system's main memory. I/O adapter 18 may be a small computer system adapter that communicates with the disk storage device 20, i.e. a hard drive. Communications adapter 34 interconnects bus 12 with an outside network enabling the data processing system to communicate with other such systems. In present day systems, data may be transmitted from other computer stations in a network, such as the Internet. Basic input devices such as mouse 26 and keyboard 24 are directly connected to system bus 12 via user interface adapter 22. Display adapter 36 includes a frame buffer 39, which is a storage device that holds a representation of each pixel on the display screen 38. Images may be stored in frame buffer 39 for display on monitor 38 through various components, such as a digital to analog converter (not shown) and the like.

The serial ports 32 to the computer system are connected through the peripheral component interconnect (PCI) 44, which includes the PCI serial bus. It is to this serial port connection that this invention is directed. Serial ports may be used to connect a wide variety of peripheral devices including joysticks for games, MIDIs for music, handheld and notebook computers for the transfer of files and scanners. Although the present illustration has shown the direct connection of communications, hard drive, keyboard and mouse to the system bus through dedicated adapters rather than through serial ports, such devices could also be connected through the serial port system. While many computer systems connect communications I/O through the general serial port system via the communication modems, where there is high communications traffic, communication channels are often dedicated. As will be subsequently described, the PCI serves to interconnect the I/O from peripheral devices connected at serial ports with the main system bus 12.

Figure 2:
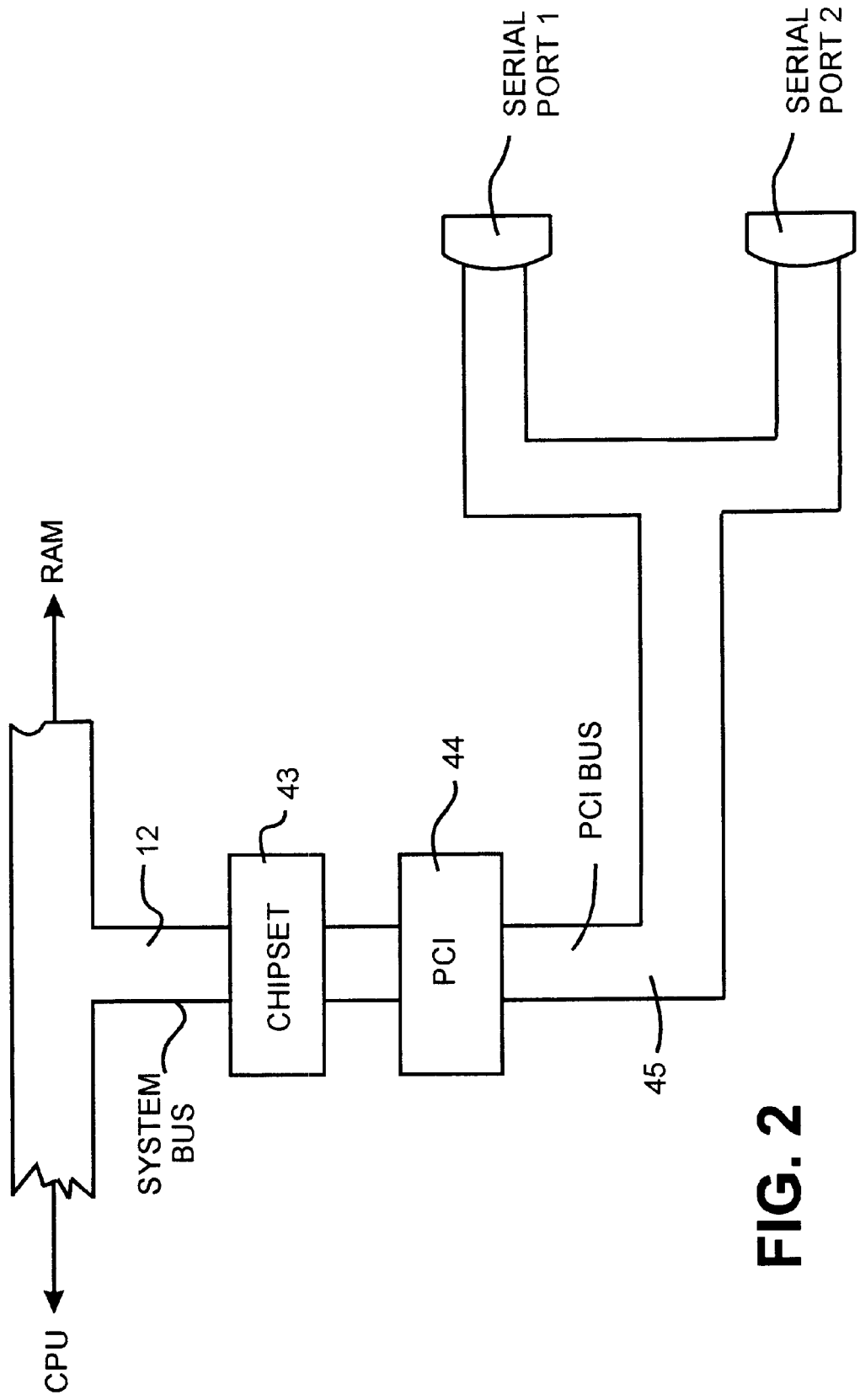
FIG. 2 is a more detailed diagram of the portion of the apparatus of FIG. 1 involved in the implementation of a simple embodiment of this invention.

FIG. 2 shows some additional details of a conventional connection of a plurality (two for illustration) of serial ports which may be identified on-screen on a display in accordance with the present invention. Serial ports 1 and 2 are conventionally connected through a PCI bus 45 under the control of PCI circuitry 44. Conventional PCIs and PCI buses are described in greater detail in the text, Personal Computer Secrets, O'Donnell, 1999, IDG Books, Foster City, Calif., particularly at pages 132, 261–263 and 266–268. The PCI is a controlled bus which operates like a local bus offering direct connection to the processor. Newer PCIs operate at widths of 64 bits at 66 MHz. They may now be controlled by 64 bit cards and now can operate at 66 MHz on servers, while on most desktop computers they still operate at widths of 32 bits and at 33 MHz. Input and output to and from peripheral devices at the serial ports is conventionally translated through the computer's chip set 43 which acts as a bridge or translator for data to and from the system bus 12. In effect, the chip set controls the internal computer bus traffic. It is through the chip sets or core logic that the peripheral devices communicate with the CPU. Conventional chip sets are described at pages 64–66 in the above-referenced text, Personal Computer Secrets.

Figure 3:
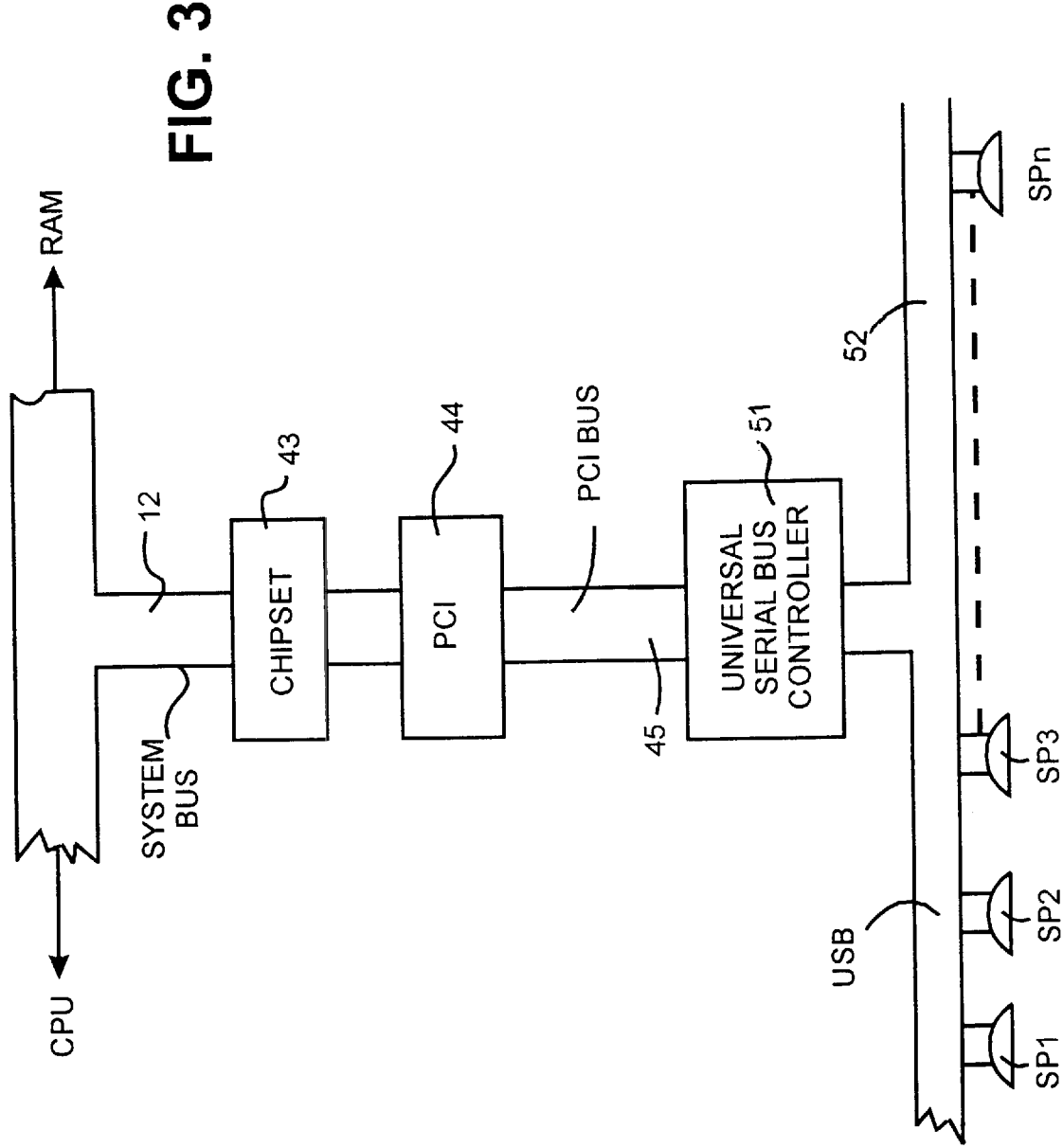
FIG. 3 is a more detailed diagram of the portion of the apparatus of FIG. 1 involved in the implementation of a another embodiment of this invention involving multiple serial ports.

As will hereinafter be described in greater detail, the present invention may be just as effectively used whether the computer has a few serial ports or has a serial port system which expands the ports to well over 100 serial ports. A typical example of such an expanded port system is shown in FIG. 3. The serial ports, SP1, SP2, SP3, . . . SPn, are connected through a standard USB 52 controlled by a USB controller 51 to the computer PCI described above. The USB is a standard for the industry. It is a serial bus which may be used to connect up to 127 peripheral devices to a computer. In order to accommodate the USB, the computer must include a USB controller 51. It may be built into the computer or it may be added by plugging a USB controller card into one of the computer's expansion slots. A general description of USBs and USB controllers may also found in the above-referenced text, Personal Computer Secrets, at pages 375–377 and 790–791. The USB controllers are dependent upon 8 or 16 bit UARTs (Universal Asynchronous Receiver-Transmitters). The conventional UART controls the flow of data to and from the peripheral device through the serial ports; it moves the data into a form acceptable by the system bus. A general description of UARTs and their functions may be found in the text, Using Networks, Derfler, by Que, a Division of Macmillan Computer Publishing, Indianapolis, IN.

Figure 4:
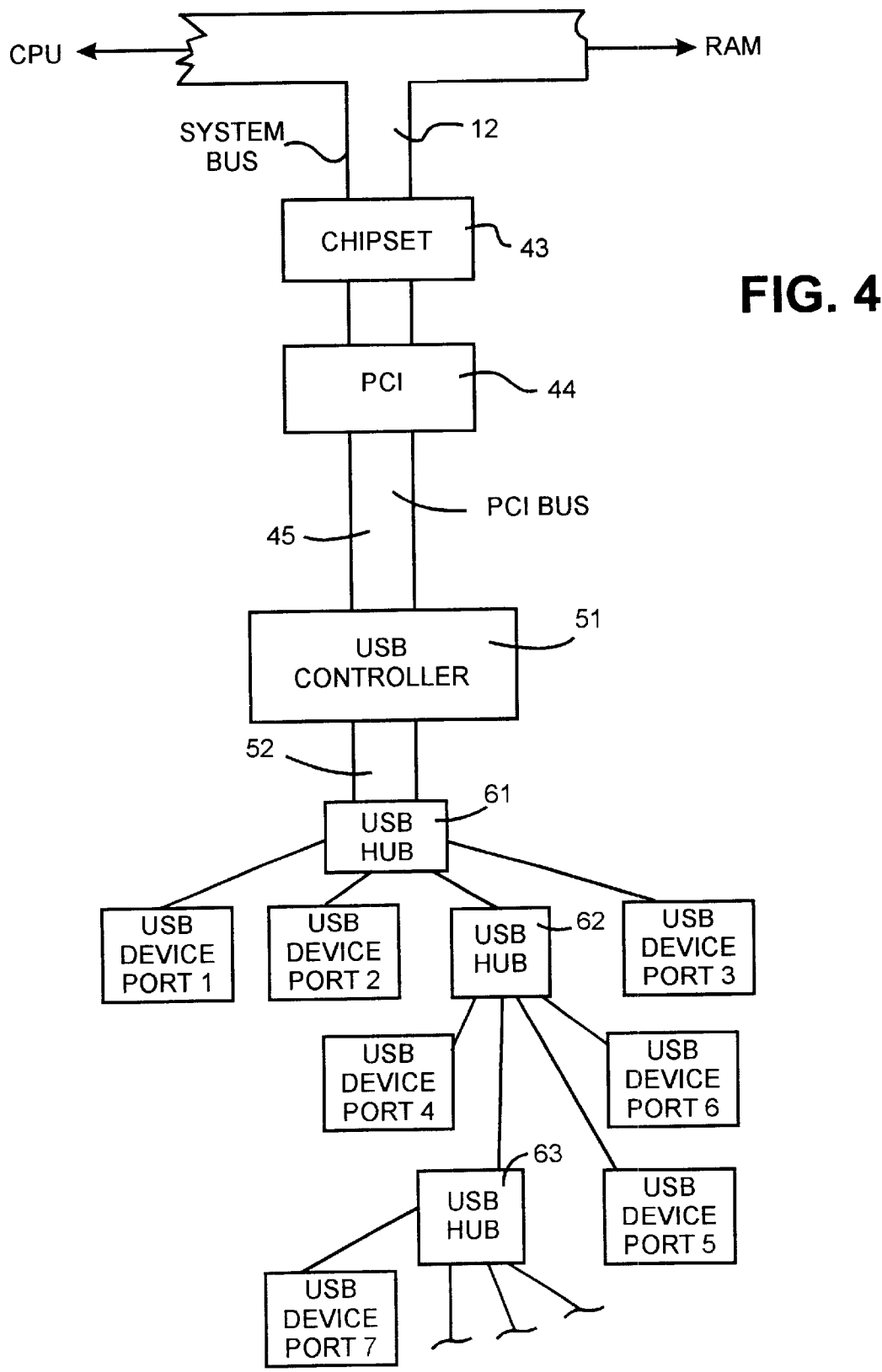
FIG. 4 is a detailed diagram of the portion of the apparatus of FIG. 1 involved in the implementation of another embodiment of this invention involving multiple serial-ports connected through a modular universal bus through which serial ports may be added via a sequence of linked hubs.

Another aspect of multiple port USB apparatus to which the serial port identification of the present invention would be applicable are hubbed USBs. Since USBs are not connectible, one to another, a USB hub has been developed which expands a serial port, usually by four. Such a hubbed arrangement is shown in FIG. 4. A hub 61 is connected to a serial port on USB 52. It provides four serial ports to which three peripheral devices may be connected, i.e. USB device ports 1, 2 and 3, as well as a port to which another hub 62 may be connected. In turn, hub 62 provides another four serial ports to which three peripheral devices may be connected, i.e. USB device ports 4, 5 and 6, as well as a port to which another hub 63 may be connected. Hub 63 has a similar accommodation including USB device port 7 and three other ports. This linking of hubs may continue until well over 100 peripheral devices may be accommodated through serial ports. USB hubs and linked hubs are described in greater detail in the above-referenced Personal Computer Secrets text, particularly at pages 149, 376, 377 and 790. The standard multiport USB Controllers are available from Intel(®) Corp.: the hubless USB controller 8x931AA and the hub USB controller 8x931HA. These are described in greater detail in Intel's Advanced Data Sheet: 8×931AA/8×931HA Universal Serial Bus Peripheral Controller, No. 273108-003, Mar. 1998, available from Intel Corp.

Figure 5:
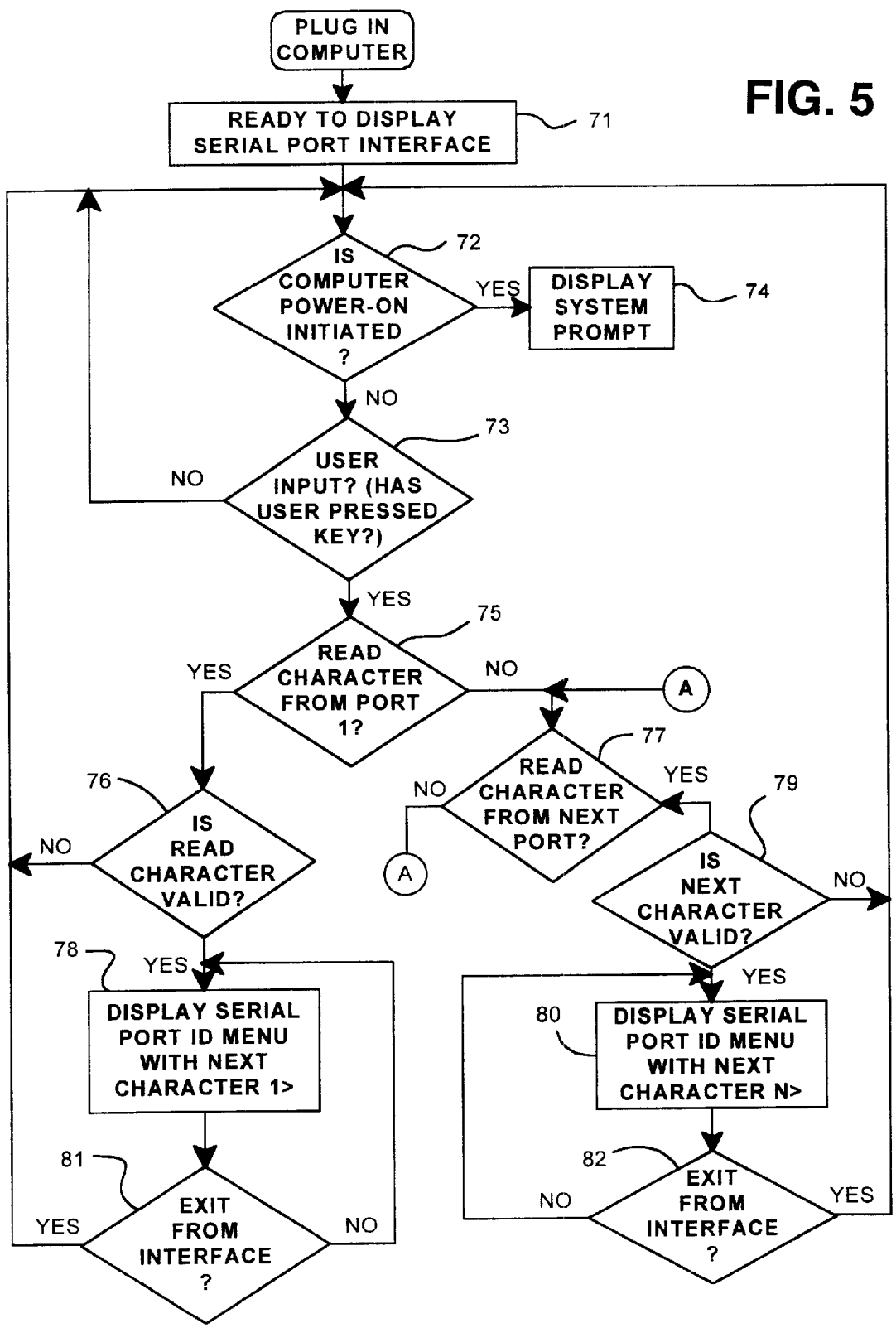
FIG. 5 is a flowchart of a program used in the present invention to determine to which of a plurality of serial ports a peripheral device has been newly added.

Now, with respect to the illustrative flowchart of FIG. 5, there will be described a procedure in accordance with the present invention by which the multiple serial ports of the apparatus of either FIG. 2, 3 or 4 may be identified on-screen. In the illustrative example which follows, the process is implemented on an IBM RS/6000 computer system with an AIX operating system. Thus, some of the processing steps may be carried out using special features of these systems. However, it should be clear to those skilled in the art how the principles of the present invention may be implemented using other systems. A table or like address accessing means is set up in storage associated with the operating system in which a number is assigned for each serial port to the system. Both AIX and Windows98 operating systems, for example, provide utilities for looking at USB serial port connections. These may be used to assign the numbers to the ports. The port numbers may be stored in any standard address look-up table. Let us assume that the computer system is plugged into an AC source and is now ready to display the serial port IDs on an ID interface as required, step 71. The system may or may not already have peripheral devices connected to its serial ports. A determination is made in decision step 72 as to whether the computer itself is powered on. In the RS/6000 computer system, the connection of peripheral devices to serial ports and the identification of the ports connected to it is most effectively done when the computer is connected but powered off. In this power off state, the RS/6000 has an operative service processor which is used to carry out various computer maintenance and housekeeping functions including serial port connection identification. Accordingly, if the decision from step 72 is Yes, the computer is powered on; then step 74, the standard system prompt is displayed which may, for example, be ">". If the decision from step 72 is No, i.e. the computer is powered off, then we are ready to monitor and identify the serial ports to which peripheral devices are connected in accordance with the present invention.

Let us assume that a peripheral device is connected to one of the serial ports. This may be sensed by any conventional means for sensing a contact to the serial port. Then, step 73, a determination is made as to whether the user has pressed any key on the keyboard. The purpose of pressing the key is to wake up the system to note that a connection has been made which must be tracked and displayed. This step is very conveniently set up by setting a timer for a period of several seconds using the conventional system clock. If the user has not pressed a key before timeout, then the decision from step 73 is No, and the process is returned to step 72 where the next connection is awaited. However, if the user has pressed a key and, thus, the decision from step 73 is Yes, then the serial ports are polled using the following sequence. A determination is made, step 75, as to whether the peripheral device has been connected to port 1, and, thus, the identifying character for serial port 1 is to be read from the table and displayed. If Yes, then a determination is made, step 76, as to whether there is an identifying character (numeral) associated with the port on the lookup table. If the decision from step 75 is No, i.e. no peripheral device is connected to port 1, then the process goes to step 77 where a determination is made as to whether the peripheral device has been connected to the next port in order (in this case port 2), and, thus, the identifying character for serial port 2 is to be read from the table and displayed. This will be subsequently described.

Getting back to step 76, if the decision from step 76 is No, there is no valid ID for the port on the lookup table, then, the process is returned to step 72 where the next connection is awaited. If the decision from step 76 is Yes, then the character or ID is displayed, step 78, conveniently within the system prompt, e.g. "1>". In a computer system operation, the identifier or numeral may be displayed on the primary display 38, FIG. 1. However, the serial port identifier may be displayed on any remote display. For example, during the setting up of a system, or in diagnosing the serial port connections to a system, the display used may be a connected "dumb terminal" display with a keyboard so that the user may press a key after serial port connection. In such a set up, the identifier may be displayed on the "dumb terminal" display. After this display of the port identifier, a determination is made, decision step 81 as to when the user is finished with the displayed identifier, if No, the display is continued as indicated by the return to step 78. If Yes, the user is finished, the process is returned to step 72 where the next connection is awaited.

Returning now to the process of polling the serial ports for the connection, if the decision from step 75 had been No, the connection had not been to port 1, then a further determination is made, step 77, as to whether the identifying character for the next serial port is to be read from the table and displayed. If the decision from step 77 is No, i.e. there is no connection to the next serial port, then the process proceeds via branch "A" back to step 77 and the next sequential serial port is polled. This is repeated until there is a Yes decision from step 77 indicating that a peripheral device has been connected to this next port, and, thus, the identifying character for the next serial port is to be read from the table and displayed. Then a determination is made, step 79, as to whether there is an identifying character (numeral) associated with the port on the lookup table. If No, then the process is returned to step 72 where the next connection is awaited. If the decision from step 79 is Yes, then the character or ID is displayed, step 80, conveniently within the system prompt, e.g. "N>". After this display of the port identifier, a determination is made, decision step 82, as to when the user is finished with the displayed identifier; if No, the display is continued as indicated by the return to step 80. If Yes, the user is finished, the process is returned to step 72 where the next connection is awaited.

While the above example has based the display of the serial port identifier on the connection to the serial port, it will be understood by those skilled in the art that the sensing at the port may be reversed so that disconnections of peripheral devices from the serial port may be sensed, after which the serial ports may be polled, as described, and the identifier for the disconnected port displayed. Thus, the means for displaying the identifier for a serial port is responsive to any change in the status of a connection to a peripheral device at said port.

One of the preferred implementations of the present invention is as a routine in an operating system made up of programming steps or instructions resident in RAM 14, FIG. 1, during computer operations. Until required by the computer system, the program instructions may be stored in another readable medium, e.g. in disk drive 20, or in a removable memory, such as an optical disk for use in a CD ROM computer input or on a floppy disk for use in a floppy disk drive computer input. Further, the program instructions may be stored in the memory of another computer prior to use in the system of the present invention and transmitted over a local area network (LAN) or a wide area network (WAN), such as the Internet, when required by the user of the present invention. One skilled in the art should appreciate that the processes controlling the present invention are capable of being distributed in computer readable media in a variety of forms.

Although certain preferred embodiments have been shown and described, it will be understood that many changes and modifications may be made therein without departing from the scope and intent of the appended claims.

What is claimed is:

1. A computer with an interactive display comprising:
   a serial I/O bus,
   a plurality of serial ports for connecting peripheral devices to said computer through said serial bus,
   means for storing but not displaying identifiers for each of said plurality of serial ports, and
   means for only displaying the identifier for a serial port responsive to any change in the status of a connection to a peripheral device at said port.

2. The computer of claim 1 wherein said change in status comprises connecting a new peripheral device to said serial port.

3. The computer of claim 1 wherein said change in status comprises disconnecting a peripheral device from said serial port.

4. The computer of claim 2 wherein said identifier is a numeral.

5. The computer of claim 2 further including a universal serial bus extension connected to one of said serial ports and comprising a plurality of serial ports.

6. The computer of claim 5 wherein said universal serial bus extension comprises a plurality of linkable bus extension modules, each of said bus extension modules comprising at least one of said plurality of serial ports.

7. The computer of claim 2 wherein said identifiers are stored in a look-up table, and said means for displaying an identifier comprises:
   means for detecting the connection of a new peripheral device to any of said serial ports, and
   means responsive to said detection for looking up the identifier for the connected port and imparting said identifier to said display means.

8. In a computer with an interactive display and a plurality of serial ports connected to a serial I/O bus, a method for connecting peripheral devices to said computer through said serial bus comprising:
   storing but not displaying identifiers for each of said plurality of serial ports, and
   only displaying the identifier for a serial port responsive to any change in the status of a connection to a peripheral device at said port.

9. The method of claim 8 wherein said change in status comprises connecting a new peripheral device to said serial port.

10. The method of claim 8 wherein said change in status comprises disconnecting a peripheral device from said serial port.

11. The method of claim 9 wherein said identifier is a numeral.

12. The method of claim 9 wherein said computer includes a universal serial bus extension connected to one of said serial ports, said bus comprising a plurality of serial ports.

13. The method of claim 12 wherein said universal serial bus extension has a plurality of linkable bus extension modules, each of said bus extension modules comprising at least one of said plurality of serial ports.

14. The method of claim 9 including:
    the step storing said identifiers in a look-up table, and
    said step of displaying an identifier comprises:
       detecting the connection of a new peripheral device to any of said serial ports, and
       responsive to said detection, looking up the identifier for the connected port and imparting said identifier to said display means.

15. A computer program having code recorded on a computer readable medium for connecting peripheral devices to a computer having an interactive display and a plurality of serial ports connected to a serial I/O bus for connecting Peripheral devices to said computer through said bus comprising:
    means for storing but not displaying identifiers for each of said plurality of serial ports, and
    means for only displaying the identifier for a serial port responsive to any change in the status of a connection to a peripheral device at said port.

16. The computer program of claim 15 wherein said change in status comprises connecting a new peripheral device to said serial port.

17. The computer program of claim 15 wherein said change in status comprises disconnecting a peripheral device from said serial port.

18. The computer program of claim 16 wherein said identifier is a numeral.

19. The computer program of claim 16 further including a universal serial bus extension connected to one of said serial ports and comprising a plurality of serial ports.

20. The computer program of claim 19 wherein said universal serial bus extension comprises a plurality of linkable bus extension modules, each of said bus extension modules comprising at least one of said plurality of serial ports.

21. The computer program of claim 16 wherein said identifiers are stored in a look-up table, and said means for displaying an identifier comprises:
    means for detecting the connection of a new peripheral device to any of said serial ports, and
    means responsive to said detection for looking up the identifier for the connected port and imparting said identifier to said display means.

* * * * *